United States Patent [19]
Nagai

[11] Patent Number: 5,544,929
[45] Date of Patent: Aug. 13, 1996

[54] AUTOMOBILE HAVING FRESH AIR VENTILATION AND OTHER HEALTH AND SAFETY FEATURES

[75] Inventor: Shinichi Nagai, Hirakata, Japan

[73] Assignee: Yugenkaisha Paramount Corporation, Osaka, Japan

[21] Appl. No.: 490,359

[22] Filed: Jun. 14, 1995

[30] Foreign Application Priority Data

Feb. 7, 1995 [JP] Japan ................................. 7-019559
Feb. 17, 1995 [JP] Japan ................................. 7-029712

[51] Int. Cl.⁶ ................................................. B62D 25/06
[52] U.S. Cl. .......................... 296/99.1; 296/208; 296/210; 454/138; 454/141; 362/74
[58] Field of Search ....................... 296/99.1, 208, 296/210; 454/138, 141; 362/74

[56] References Cited

U.S. PATENT DOCUMENTS

| | | | |
|---|---|---|---|
| 1,956,123 | 4/1934 | Givens | 454/138 |
| 2,087,651 | 7/1937 | Mygland | 454/138 |
| 2,153,147 | 4/1939 | Lintern | 362/74 |
| 3,080,807 | 3/1963 | Barényi | 454/138 |
| 3,318,631 | 5/1967 | Levy | 362/74 |
| 3,476,032 | 11/1969 | Mattly | 296/210 |

FOREIGN PATENT DOCUMENTS

| | | | |
|---|---|---|---|
| 743939 | 1/1933 | France | 362/74 |
| 1089646 | 3/1955 | France | 365/74 |
| 515735 | 1/1931 | Germany | 362/74 |
| 1355504A | 11/1987 | U.S.S.R. | 454/138 |
| 532722 | 1/1941 | United Kingdom | 362/74 |

*Primary Examiner*—Gary C. Hoge
*Attorney, Agent, or Firm*—Armstrong, Westerman, Hattori, McLeland & Naughton

[57] ABSTRACT

An automobile capable of protecting a driver from direct rays of the sun from the front or rear side of body, and further enhancing the power of attention to the front side thereof. The automobile has a front visor protruded forward from a front head portion of a body and a rear visor protruded backward from a rear head portion of the body.

3 Claims, 5 Drawing Sheets

AUTOMOBILE HAVING FRESH AIR VENTILATION AND OTHER HEALTH AND SAFETY FEATURES

BACKGROUND OF THE INVENTION

The present invention relates to an automobile having wonderful and practical value and which is safe for a driver's good health, and which is safe for driving and a safeguard against disaster. More particularly, it relates to an automobile which is capable of protecting a driver from the direct rays of the sun from a front or a rear side of a body of the automobile and which further enhances the driver's power of attention to the front, by protruding each visor from a head portion of the body at forward and rearward ends, respectively. Also, it relates to an automobile which is capable of ventilating air within the automobile, safely and sanitarily, even when doors and windows of the automobile are closed. Further, it relates to an automobile capable of securing the safety of a wide back scope when the automobile goes backwards in reverse. Still further, it relates to an automobile which is capable of avoiding trouble of a collision from behind when the driver gets out of the automobile, which trouble has accompanied the recent increase of traffic, by having an improved arrangement of seats and doors of the automobile.

So far, when an automobile is driven at a time when the height of sun is low, such as in the morning or in the evening, the direct rays of the sun impinge upon the body or the face of the driver from the front or the rear side of the body of the automobile. As a result problems arise such as that the driver cannot look and confirm something surrounding the automobile such as a sign and an obstacle because of the gleeming sunlight. In addition, the driver is sometimes affected by sunstroke.

Moreover, when it has been desired to have the inner space of the automobile ventilated, various methods have been employed. For example, while the automobile is running or parking, a door or window has been opened to exhaust non-fresh air in the automobile and to introduce fresh air from outside of the automobile into the automobile. However, this ventilating method is not preferable from the viewpoints of safety and sanitation. In this regard, if the door or window is opened for ventilation, sand, a small stone or the like can dash, or enter into the automobile while the automobile is running.

Further, in a conventional automobile, means for awakening the driver's power of attention to the front is not provided. Therefore, when the automobile is running for a long time, the driver's power of attention to the front is decreased greatly. Accordingly, it is difficult for the driver to operate the automobile safely for a long time.

Further, in the conventional automobile, when the automobile goes backwards into a garage or the like, the driver operates the automobile while looking and confirming using the reflection in the rearview mirror in the automobile and in the sideview mirrors on both sides of the body, or with looking and confirming directly by the driver. However, even in such methods for looking and confirming backward movement it is impossible to look at something near the rear side of the automobile or the like and to confirm it. Thus, the driver's perception has been relied upon in a manner unable to avoid problems. Therefore, problems arise such as that the automobile contacts the wall of the garage and collides with an obstacle when the obstacle appears behind the automobile suddenly. Especially, such problems are likely to occur while going backwards during the night.

Further, in the conventional automobile, doors are provided at each of the driver's seat and the assistant driver's seat sides of the body. The driver opens the door of the driver's seat side and gets into and out of the automobile. However, the door of the driver's seat side faces to a center of a roadway, thereby causing the problem that if the driver carelessly opens the door of the driver's seat side and gets out of the automobile, the driver can be collided from behind by a passing car.

The present invention is intended to solve these problems, and it is hence a primary object thereof to provide an automobile capable of protecting a driver from direct rays of the sun from the front or rear side of the automobile, and further enhancing the driver's power of attention to the front side.

It is another object of the present invention to provide an automobile capable of ventilating air into the automobile safely and sanitarily while running, or while being stopped.

It is yet another object of the present invention to provide an automobile capable of securing the safety of a wide back scope involving a region near the rear side thereof.

It is still another object of the present invention to provide an automobile capable of surely securing the safety of the driver when the driver gets out of the automobile.

SUMMARY OF THE INVENTION

In a first aspect of the present invention, an automobile is provided which has a front visor protruding forwards from a front head portion of a body and a rear visor protruding backwards from a rear head portion of the body.

It is preferred that an illuminating means is provided nearby a tip of the front visor.

It is preferred that each lower surface of the front visor and the rear visor is formed so as to rise toward each tip of the front visor and the rear visor.

It is preferred that an air-inlet with a filter is formed at at least a part of the front visor, and that an air-outlet is formed at at least a part of the rear visor.

In a second aspect of the present invention, an automobile is provided which has a rear visor protruding backwards from a rear head portion of a body of the automobile, a television camera provided at a portion near a tip of the rear visor, and a display for outputting image information inputted by the television camera, the display being provided on an appropriate position of a dashboard in the automobile.

It is preferred that an illuminating means is provided nearby a tip of the rear visor.

It is preferred that each lower surface of the front visor and rear visor is formed so as to rise toward each tip of the front visor and rear visor.

In a third aspect of the present invention, an automobile is provided which has at least a driver's seat and an assistant driver's seat, wherein the assistant driver's seat is arranged at the rear of the driver's seat, and a door is only provided at the side of the assistant driver's seat side of a body of the automobile.

According to the first aspect of the present invention, the automobile has a front visor protruding forwards from the front head portion of the body and a rear visor protruding backwards from the rear head portion of the body, so that sunlight from the front and the rear of the automobile is shut out by the front visor and by the rear visor. Therefore, in spite of the time zone, such as whether it is the morning or the evening, or in spite of the traveling direction of the automobile, the driver ca be surely protected against the direct rays of the sun.

Moreover, if an air-inlet with a filter is formed at the front visor and an air-outlet is formed at the rear visor, fresh air outside of the automobile can be naturally introduced into the automobile through the air-inlet during the running of the automobile while non-fresh air in the automobile can be exhausted out of the automobile, even if the windows are not opened, whereby a safe and sanitary ventilation can be done.

Further, when wind blows from behind the body while the automobile is at a stop, the outside air is introduced through the rear visor and exhausted through the front visor.

Further, according to the second aspect of the present invention, when the automobile goes backwards in reverse, image information about the backside of the automobile is inputted by a television camera provided nearby the tip of the rear visor protruding backwards from the rear head portion of the body, and the image information is outputted by a display provided on a dashboard in the automobile, whereby the driver can look at an obstacle behind the automobile and confirm it surely. Thus, the driver can operate the automobile to go backwards safely and surely.

Further, according to the third aspect of the present invention, since an assistant driver's seat is arranged at the rear of a driver's seat, and since a door is only provided at the side of the assistant driver's seat side of the body, when the driver gets out of the automobile, the driver goes across a space in front of the assistant driver's seat, and goes out of the automobile through the door at the assistant driver's seat side that is, the door facing a side edge of a roadway. Therefore, this prevents trouble of having the driver collided from behind by a passing car.

DETAILED DESCRIPTION

Figure 1:
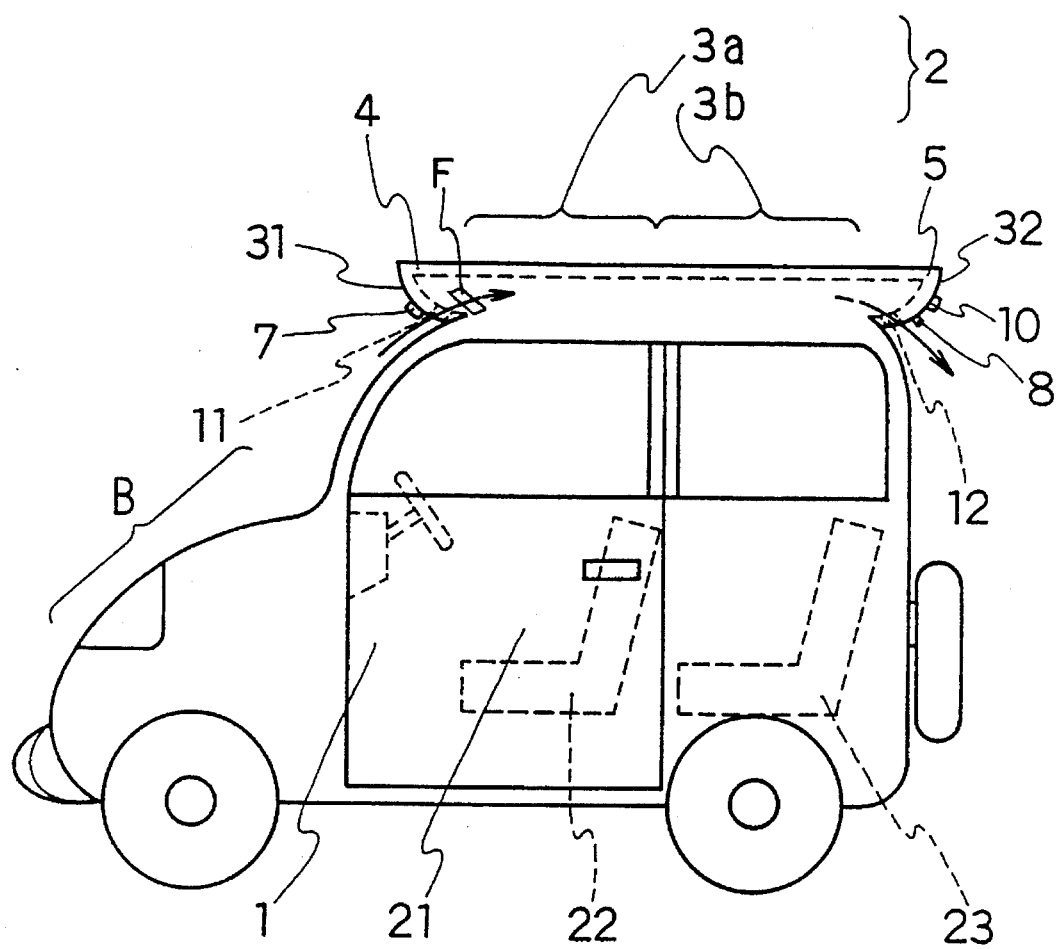
FIG. 1 is a side view showing an embodiment of an automobile according to the present invention.

Referring now to the drawings, an automobile of the present invention is described in detail below.

An automobile shown in FIGS. 1 to 3 has a constitution as described below. E indicates an engine. An overall external appearance of this automobile is designed to imitate an antique modern car having an image of a so-called covered wagon.

In a shape of an upper portion of a body 1, a head portion 2 of the body 1 is slightly protruded upward, and a front visor 4 protrudes forwards from a front head portion 3a, and a rear visor 5 protrudes backwards from a rear head portion 3b. Each of the front visor 4 and the rear visor 5 is a streamlined member which comprises a steel board and the like having a length of approximately 150 to 300 mm. The front visor 4 and the rear visor 5 function as a sunvisor in the forward and backward direction of the body 1, so that the driver can be protected from direct rays of the sun during most of the duration of the sunlight throughout one year. For example, even if a traveling route is in the direction from west to east and a returning route is in the direction from east to west and vice versa, the face of the driver is protected from being exposed to direct rays of the sun to ensure a preferable scope, or a back of the driver is protected from being exposed to direct rays of the sun to ease a sense of fatigue.

Further, the front visor 4 shuts out the upper scope from just above the driver's eye to approximate 100 to 200 cm forward in the driver's scope, thereby the driver can concentrate on the remaining front scope which is not shut out.

Further, nearby the tip (the front most end) of the front visor 4, as an illuminating means, lamps 7 are provided downward at both left and right sides respectively. Therefore, when the engine is inspected in night, if a hood B is opened and lamps 7 are turned ON, the inside of an engine room can be illuminated in every nook and corner to facilitate inspection. Also, the inspector need not have a hand held illuminating means such as a flashlight so that work can be done easily using both hands.

Each lower surface 31, 32 of the front visor 4 and the rear visor 5 is formed so as to rise toward each tip of the front visor 4 and rear visor 5.

Therefore, without narrowing each of the forward and the backward upper scope of vision, the face and the back of the driver can be protected preferably from direct rays of the sun. As a result, mental irritation by direct exposure to one's face can be reduced, and the driver's power of attention to the front side can be enhanced naturally, so that the driver can devote himself to safety driving. At the same time, physical fatigue by direct exposure to one's back can be eased.

On the other hand, nearby the tip of the rear visor 5, a television camera 8 is provided which is directed downward. As a display for outputting image information inputted by the television camera 8, a television 9 is provided on an appropriate position of a dashboard D in the automobile. Further, like the front visor 4, nearby the tip of the rear visor 5, lamps 10 are provided and directed downward at both left and right sides, respectively. Therefore, even if there is an obstacle nearby the rear of the automobile, the image information about this obstacle is inputted to the television camera 8, transmitted to the television 9 through a cable disposed in the body (not shown), and is, thus, looked at and confirmed by the driver. Therefore, by using the television 9 together with the rearview mirror and the side mirror conventionally used, a wide backward scope can be secure, whereby the automobile can go backwards safely and in a surely. Further, if lamp 10 is turned ON, even at night or in a dark inner space of a garage, by utilizing the television camera 8 and the television 9, the automobile can go backwards safely and surely by securing the backward scope of vision.

Figure 3:
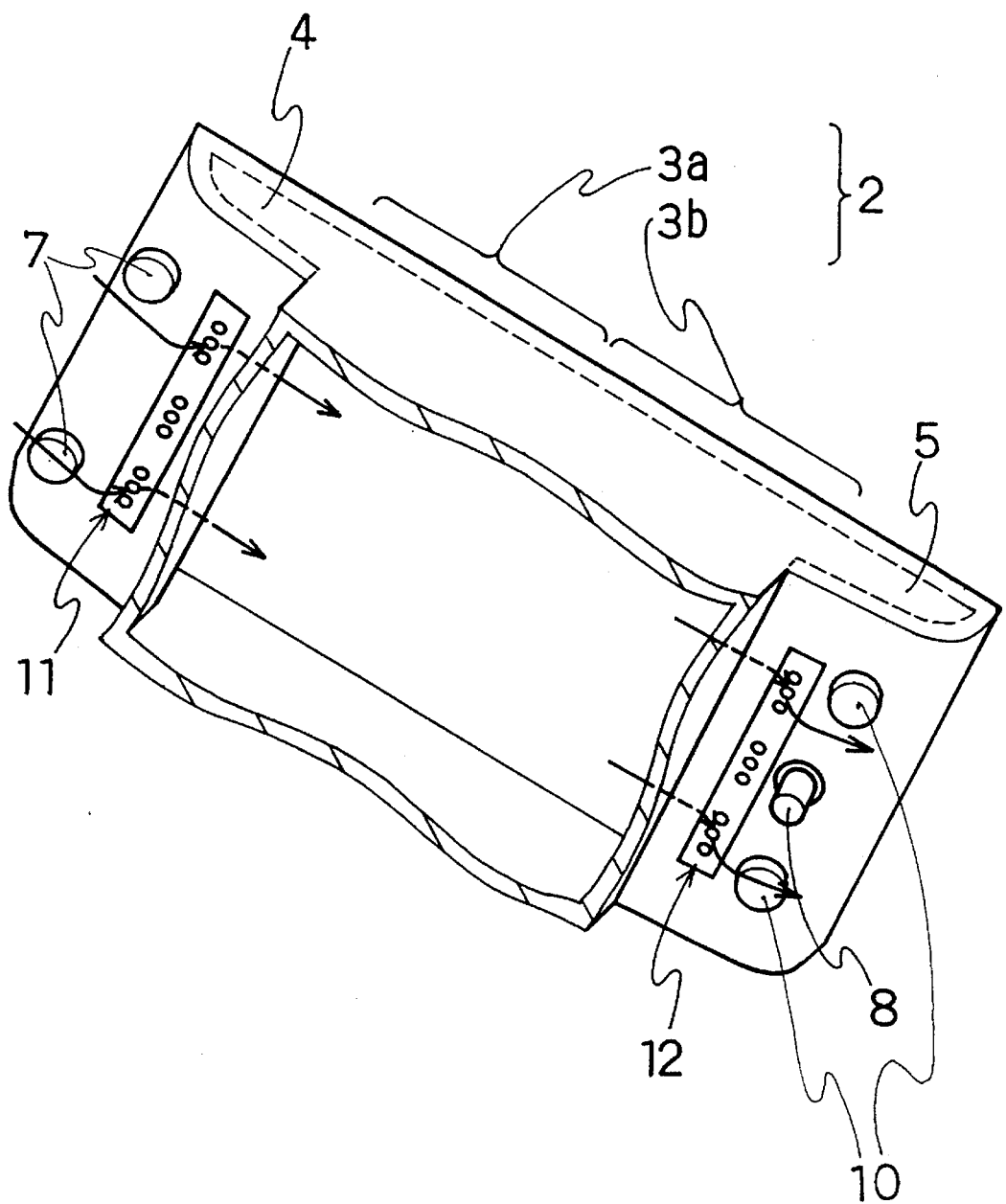
FIG. 3 is a partly enlarged view showing a head portion of the automobile in FIG. 1.

Further, as shown in FIGS. 1 and 3, an air-inlet 11 for introducing the outside air into the automobile opens at a lower surface of the front visor 4, and an air-outlet 12 for exhausting air in the automobile to outside opens at a lower surface of the rear visor 5. Also, a filter F is provided to the air-inlet 11, so that dust or the like outside of the automobile can be prevented from invading the automobile.

Each of the air-inlet 11 and the air-outlet 12 comprises, for example, a plurality of perforations, and includes a shutter (not shown) for regulating the amount of air flow or the like.

Figure 4:
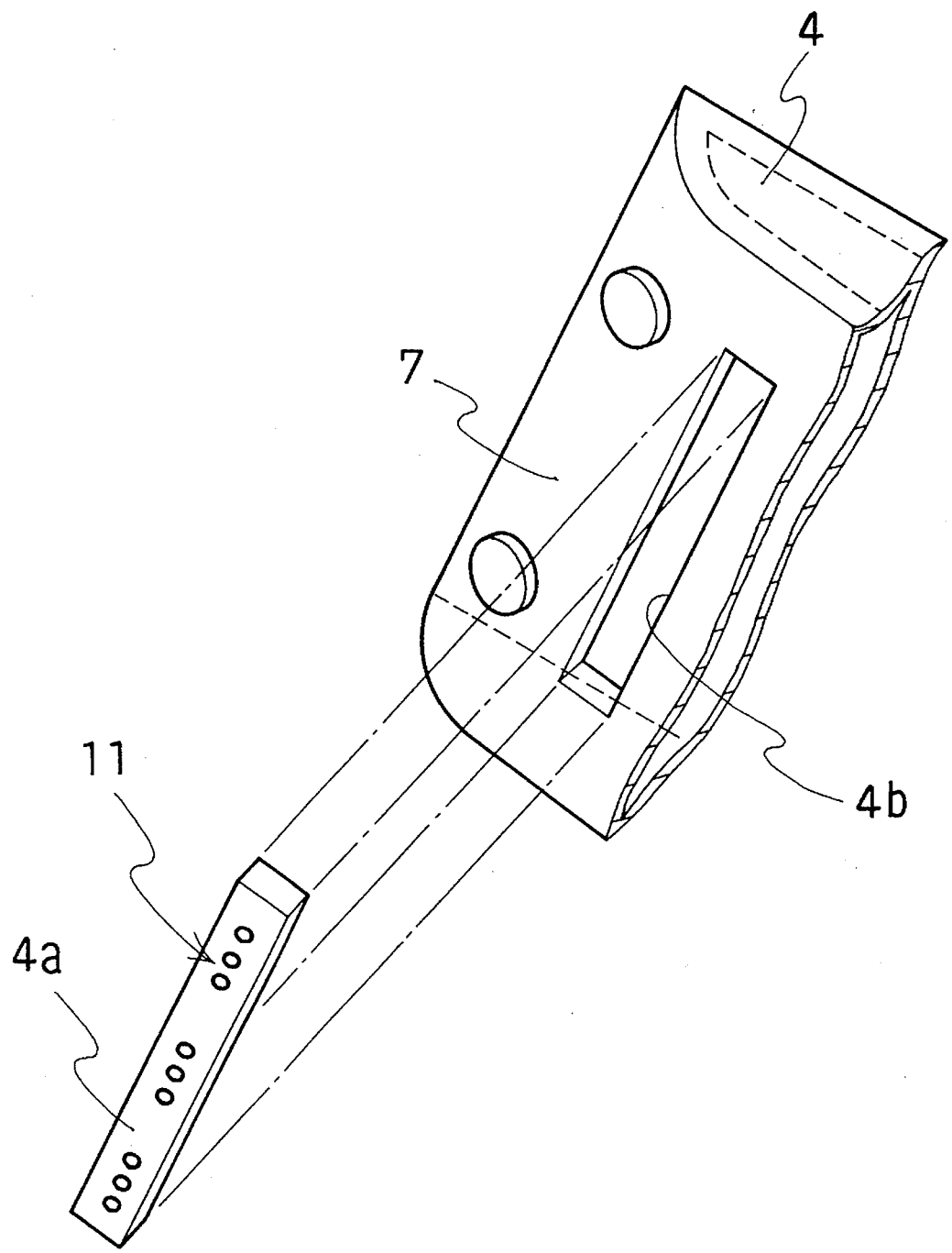
FIG. 4 is a perspective exploded view of a main portion showing a constitution nearby an air-inlet in the automobile of FIG. 1.

The air-inlet 11 and the air-outlet 12 can be formed at at least a part of the front visor 4 and the rear visor 5, respectively, by appropriate forming methods. As an example of a method for forming the air-inlet 11, for example, as shown in FIG. 4, a rectangular opening 4b is formed at the lower surface of the front visor 4, and a cap member 4a having an air-inlet 11 is fitted into the opening 4b. Furthermore, the air-outlet 12 at the rear visor 5 can be formed by the same method as that for the air-inlet 11.

In the present invention, however, the number of and the arrangement of the air-inlets 11 and the air-outlets 12 are not limited particularly—the appropriate number and arrangement may be employed. For example, if three inlets or outlets are arranged at the center and at both sides of the cap member, respectively, that is, if nine inlets or outlets in total are so arranged, smooth ventilation in every nook and corner of the automobile is preferably performed.

Figure 5:
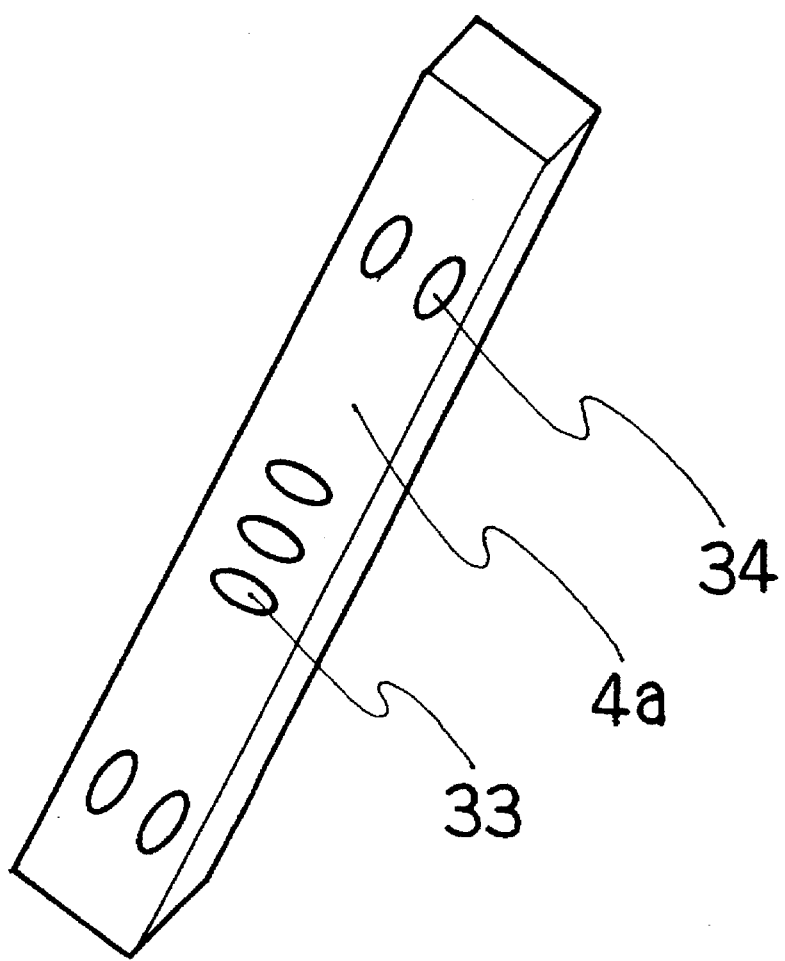
FIG. 5 is a perspective exploded view of a main portion showing a constitution nearby an air-inlet in another embodiment of the automobile according to the present invention.

Furthermore, in the above-mentioned embodiment, there is explained an example in which a plurality of round holes, as air-inlets 11 and air-outlets 12, are formed in a line along the direction of the width of the body. However, the present invention is not limited to this example alone, and air-inlets and air-outlets having various shapes and arrangements might be formed. For example, as shown in FIG. 5, three first air-inlets 33 having an oval shape are formed at the center of the cap member 4a along the front and rear direction of the body and two second air-inlets 34 having an oval shape are formed at both sides of the cap member 4a along the direction of the width of the body. Thus, a small lattice with a filter capable of opening and closing might be provided at the three points, i.e., at the center and at both sides of the cap member 4a. Furthermore, as not shown in figures, air-outlets might be formed in the same shape and arrangement as the above-mentioned air-inlets. By employing the thus formed air-inlets and air-outlets, air can be introduced through both of the first air-inlets 33 and second air-inlets 34 while the automobile is running. On the other hand, air can be introduced into the automobile preferably through the second air-inlets 34 along the width of the body while the automobile is at a stop.

By the provision of the air-inlets 11 and the air-outlets 12, during the running of the automobile, fresh air outside the automobile can be introduced into an inner space 6 of the automobile through the air-inlets 11 of the front visor 4 appropriately, and at the same time, non-fresh air in the inner space 6 can be exhausted through the air-outlets 12 of the rear visor 5. Therefore, the inner space can be kept as an environment which is good for the health of the driver and the passenger. Also, even at a stop, if the air-inlets 11 and the air-outlets 12 are kept open, air can be exchanged between the inner space and the outside. Furthermore, when wind blows from behind the body while the automobile is at a stop, the air is introduced through the air-outlets 12, and is exhausted through the air-inlets 11. Thereby, the same air exchanging as per the above-mentioned can be done.

Further, by providing both the front visor with air-inlets and the rear visor with air-outlets, even when the automobile is running, parked, or at a stop, or when a door thereof is locked, the inner space can be effectively ventilated. Thus, at all times the air in the automobile can be purified, and a good environment for one's health and sanitation can be maintained. Further, even if the door and windows are in a closed condition, the inner space can be ventilated, so that the danger of someone invading from outside or the like can be prevented when the driver parks or stops the automobile in order to rest.

Moreover, in the summer, when the automobile is parked in a parking lot without a roof over the automobile for a long time, the front visor and the rear visor can effectively shut out the direct rays of the sun into the inner space, and at the same time, the hot air in the automobile can be evacuated by the air-inlets and the air-outlets at the front and rear sides of the automobile, so that overheating in the automobile can be prevented. On the other hand, in winter, when the automobile is parked in a parking lot without a roof over the automobile for a long time, by shutting the shutters disposed at the inlets and the outlets or the like, the outside air can be prevented from entering the automobile, so that excessive cooling in the automobile can be prevented.

Further, especially in the case of an earthquake or a typhoon, the danger and disaster caused by something falling onto the automobile from above can be prevented by means of the front visor and the rear visor.

Still further, the ventilating mechanism of the present invention requires no energy, such as electricity, so that the trouble cannot occur, and no cost for working is required.

Furthermore, for heating in the winter (especially, in the winter in a cold district) or for cooling in the summer, it is preferred that a conventional air conditioner is equipped in the automobile.

Next, an arrangement of a door 21, a driver's seat 22, and an assistant driver's seat 23 is explained.

Figure 2:
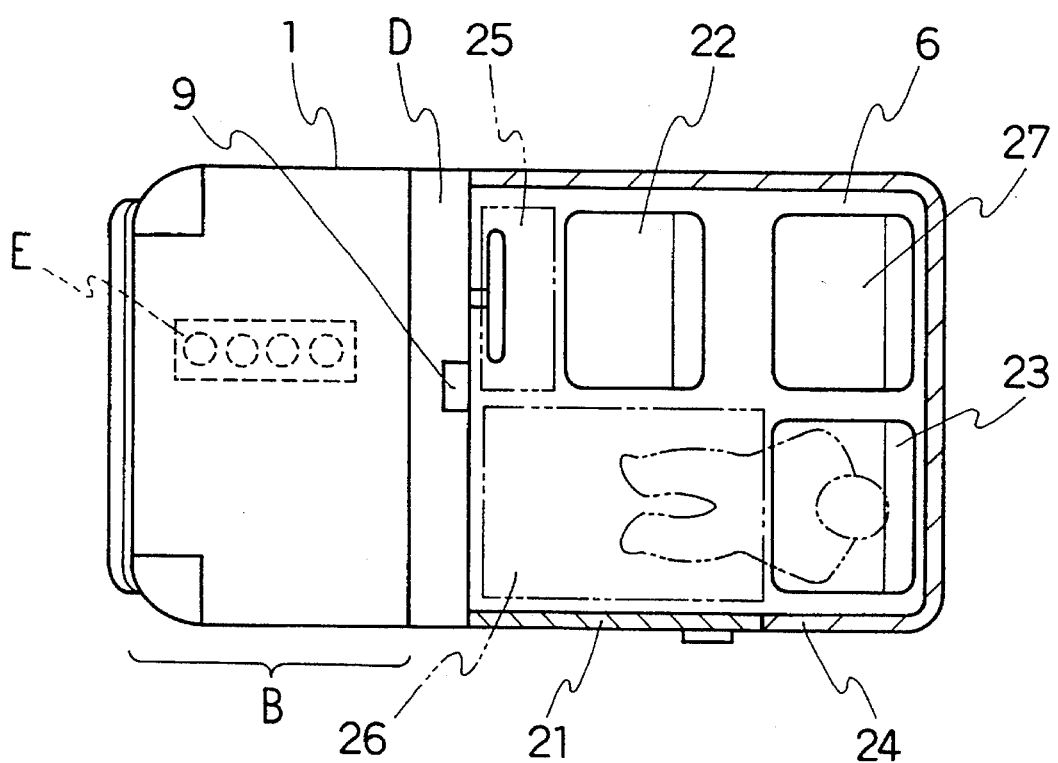
FIG. 2 is an explanatory view schematically showing an arrangement of the seats and the door in the automobile in FIG. 1.

In the automobile of this embodiment, as shown in FIGS. 1 and 2, a door 21 is only provided at the side surface 24 of the assistant driver's seat 23 side of the body 1. The driver opens this door 21 to go off the automobile at the side edge of the roadway, so that there is no trouble that the driver is collided with from his behind by a passing car. Moreover, the driver's seat 22 is disposed at the front side of the inner space 6, and the assistant driver's seat 23 is arranged at the rear of the driver's seat 22. Numeral 27 indicates a back seat. To be concrete, the assistant driver's seat 23 is disposed 300 to 600 mm behind the driver's seat 22 along the front to rear direction of the automobile. Thereby, a space 26 in front of the assistant driver's seat 23 which is broader than the space 25 in front of the driver's seat 22 can be secured. Therefore, the driver goes across the space 26 in front of the assistant driver's seat 23, and goes off the automobile easily through the door 21 disposed at the assistant driver's seat 23 side.

Further, when sitting down on the assistant driver's seat 23, if the passenger inclines his backrest backward and extends his feet into the space 26, the passenger can sit down in a very comfortable style.

On the condition that a space 26 which is broader than the space 25 can be secured, the assistant driver's seat 23 might be so disposed that the front edge of the assistant driver's seat 23 is positioned in front of or at the rear of the rear edge of the driver's seat 22. Especially, if the front edge of the assistant driver's seat 23 is positioned in front of the rear edge of the driver's seat 22, i.e., if the assistant driver's seat 23 and driver's seat 22 are overlapped a little with each other in the front to rear direction of the automobile, the total length of the automobile can be shortened preferably (furthermore, in this case, a rear seat is omitted). It is preferred that the length of this overlapped portion is approximately 200 to 500 mm so as to attain both the securing of the space 26 and the shortening of the total length of the body. It is also preferred that the assistant driver's seat 23 is slidable along the front to rear direction of the automobile so as to enable adjustment, for comfort when sitting down.

Further, the broad space 26 in front of the assistant driver's seat 23 is secured, so that the passenger at the assistant driver's seat 23 can sit comfortably while extending his feet far enough. Even if the car stops suddenly, the passenger is kept safe because of the long distance to the dashboard D.

Further, conversation between the passenger sitting on the assistant's driver's seat 23 with the driver is limited because the passenger is behind the driver. Therefore, the driver devotes himself to the driving of the automobile.

Furthermore, the outer shape of the body is not particularly limited in the present invention and it is preferred that the body is not streamlined and each of a front, rear, left, and right windows is arranged so as to extend along the vertical direction, so that the chance that the glass of the windows is broken by falling things or the like is small, which especially ensures safety at the time of an earthquake.

The automobile of the embodiment thus constituted can be applied to various types of automobiles. That is, it can be widely applied to an automobile in commercial use, an automobile for attending an office, an automobile in family use, a sports car, an all-round and a multipurpose automobile, or the like. Moreover, the automobile is designed so as to enable all-weather running. Further, to be concrete, a large or a small car for utility, for attending an office, for sports use or the like; a taxi; a large or small truck for carrying foods, animals or plants; a bus for riding together; a sightseeing bus; a leisure car; a leisure trailer and the like can be applied with the present invention. In the above automobiles, the present invention is especially and effectively applied to a truck for running a long distance. Moreover, as an option, a mobilephone or a television can be disposed in the automobile.

Further, the constitution of the above automobile is designed, so to speak, as the specifications of a safely automobile, a low-speed automobile, no traffic accident automobile and an economical automobile. That is, for the purposes of keeping safety and low-speed absolutely, it is preferred that the maximum speed of the automobile is regulated by displacement of an engine and gear rationing (that is, regulation of the ratios of gears), so as not to exceed approximately 80 km per hour. For example, for the purpose that the automobile does not run over 80 km per hour even if an accelerator is fully stepped on, an engine with a small displacement can be used, or a small ratio of gears can be regulated so as to keep the maximum speed to be not more than 80 km per hour. Furthermore, a large automobile, such as a truck, bus or the like is not limited to such regulation, and an engine thereof might have a large displacement.

In the automobile of this embodiment, a small ratio of gears might be regulated so that the torque is enhanced and so that the power of climbing up a slope is strengthened.

Further, in the automobile of this embodiment, an outer surface thereof is colored with a color of a safe automobile, such as orange.

Further, in the automobile of this embodiment, for a solution of today's traffic jams and garage shortages, the width is that of a small automobile of preferably about 1200 to 1400 mm, the height thereof is about 1200 to 1400 mm, the total length thereof is about 2000 to 4000 mm (more preferably about 3000 to 3500 mm), though these are not limitative in the present invention.

The automobile of this embodiment thus designed has the comfort of an automobile and the lightness of an autocycle, and therefore is a subminiature car which is suitable for being called a "carcyle".

The above description is a general description of the automobile with reference to the present invention. The present invention is not, however, limited to this, and it is needless to say that the present invention can be applied for an automobile in a middle or large size.

Moreover, especially, the mechanism for ventilating air in the automobile as in the embodiment can be employed not only for a small automobile for utility such as above-mentioned carcyle, but also for other automobiles of various sizes or purposes.

For example, in the case of an automobile, the above mechanism for ventilating can be employed in small automobiles, middle size automobiles and large size automobiles. In the case of a bus, the above mechanism for ventilating can be preferably employed in a bus for riding together, a sightseeing bus, a bus for picnics (i.e., a bus with a kitchen, dining room and the like) or the like. Further, in the case of a truck, the above mechanism for ventilating can be preferably employed especially in a truck for carrying something which requires ventilating, such as food, fruit, and animals (especially, a racehorse or the like). Further the above mechanism for ventilating can be preferably employed in a trailer like in the case of a truck.

Accordingly, to the present invention, since an automobile having a front visor and a rear visor which protrudes forwards and backwards from the body of the automobile, respectively, regardless of the time zone, such as whether it is morning or evening, and of the travelling direction of the automobile, the driver can be surely protected against the direct rays of the sun.

Moreover, according to the present invention, an air-inlet with a filter is formed at the front visor and an air-outlet is formed at the rear visor, and the fresh outside air can be naturally introduced into the automobile through the air-inlet while non-fresh air in the automobile can be exhausted out of the automobile during the running of the automobile without opening the windows, thereby enabling safe and sanitary ventilation.

The front visor and the rear visor in the present invention do not always require adjustment of the air-inlets and the air-outlets. Further, no energy, such as electricity, is required, so that trouble associated therewith cannot occur, and no cost for operating is required.

Further, when the automobile is parked in a parking lot without a roof over the automobile, in the summer, overheating in the automobile can be prevented by opening the air-inlets of the front visor and the air-outlets of the rear visor, and in winter, excessive cooling in the automobile can be prevented by shutting the air-inlets and the air-outlets.

Further, by the provision of a television camera near the tip of the rear visor and a display on a dashboard in the automobile, the driver can look at an obstacle behind the automobile and confirm in surely. Thus, the driver can drive the automobile into a garage safely and surely.

Further, in the case where a door is only provided on the side of an assistant driver's seat of the body and the assistant driver's seat is arranged behind the driver's seat, the driver can get off the automobile easily through the door without the trouble that the driver may be collided with from behind by a passing car.

Further, with respect to the outer shape of the body, if each of the front, the rear, and the left and right windows is arranged so as to extend along a vertical direction, the rate at which the glass in the windows is broken by falling things or the like is small, which especially ensures safety at the time of an earthquake.

While only certain presently preferred embodiments have been described in detail, as will be apparent with those familiar with the art, certain changes and modifications can be made without departing from the spirit and scope of the invention as defined by the following claims.

What is claimed is:

1. An automobile, comprising:

a front visor protruded forward from a front head portion of a body of said automobile and a rear visor protruded backward from a rear head portion of the body;

a plurality of air-inlets formed in the front visor for introducing air outside of the automobile into the automobile;

said air-inlets having a filter for filtering the introduced air;

a plurality of air-outlets formed in the rear visor for exhausting air within the automobile to outside the automobile;

said air-inlets including a first set of air-inlets formed at a center of the front visor, each air inlet of said first set of air inlets having an oval shape and having a longitudinal axis thereof extending along a front to rear direction of the body and two second sets of air-inlets formed, respectively, at opposite sides of the first set of air-inlets, each air inlet of said two second sets of air-inlets having an oval shape and having a longitudinal axis thereof extending along the direction of the width of the body;

said air-outlets including a first set of air-outlets formed at a center of the rear visor, each air outlet of said first set of air outlets having an oval shape and having a longitudinal axis thereof extending along a front to rear direction of the body and two second sets of air-outlets formed, respectively, at opposite sides of the first set of air-outlets, each air-outlet of said two second sets of air-outlets having an oval shape and having a longitudinal axis thereof extending along the direction of the width of the body.

2. The automobile of claim 1, wherein an illuminating means is provided nearby a tip of the front visor.

3. The automobile of claim 1, wherein a lower surface of the front visor is formed so as to rise toward an outer edge of the front visor and a lower surface of the rear visor is formed so as to rise toward an outer edge of the rear visor.

* * * * *